US008266717B2

(12) United States Patent
Pan (10) Patent No.: US 8,266,717 B2
(45) Date of Patent: Sep. 11, 2012

(54) MONITORING DEVICE FOR A COMPUTING DEVICE OF A COMPUTER SYSTEM, THE COMPUTER SYSTEM, AND METHOD FOR MONITORING THE COMPUTING DEVICE OF THE COMPUTER SYSTEM

(75) Inventor: Yi-Shin Pan, Taipei Hsien (TW)

(73) Assignee: Wistron Corporation (TW)

( * ) Notice: Subject to any disclaimer, the term of this patent is extended or adjusted under 35 U.S.C. 154(b) by 948 days.

(21) Appl. No.: 11/779,763

(22) Filed: Jul. 18, 2007

(65) Prior Publication Data
US 2008/0129577 A1 Jun. 5, 2008

(30) Foreign Application Priority Data

Dec. 1, 2006 (TW) ................................ 95144679 A (51) Int. Cl.
*G06F 21/02* (2006.01)
(52) U.S. Cl. .............. 726/34; 726/9; 713/155; 713/164; 713/186
(58) Field of Classification Search ...................... 726/34
See application file for complete search history.

(56) References Cited

U.S. PATENT DOCUMENTS

| 6,546,436 | B1 * | 4/2003 | Fainmesser et al. | 710/5 |
| 6,721,889 | B1 * | 4/2004 | Jaegtnes et al. | 726/34 |
| 6,978,474 | B1 * | 12/2005 | Sheppard et al. | 725/83 |
| 7,062,167 | B2 * | 6/2006 | Saito | 398/33 |
| 7,432,803 | B2 * | 10/2008 | Fails et al. | 340/531 |
| 2003/0126317 | A1 * | 7/2003 | Chang | 710/15 |
| 2003/0210167 | A1 * | 11/2003 | Weng | 341/176 |
| 2004/0046731 | A1 * | 3/2004 | Wu | 345/156 |
| 2004/0064728 | A1 * | 4/2004 | Scheurich | 713/201 |
| 2004/0141485 | A1 * | 7/2004 | Yoshino et al. | 370/338 |
| 2005/0080915 | A1 * | 4/2005 | Shoemaker et al. | 709/231 |
| 2006/0146031 | A1 * | 7/2006 | Wang et al. | 345/173 |
| 2006/0282541 | A1 * | 12/2006 | Hiroki | 709/228 |

FOREIGN PATENT DOCUMENTS

| CN | 1267022 A | 9/2000 |
| CN | 2531440 Y | 1/2003 |
| CN | 2561009 Y | 7/2003 |

(Continued)

OTHER PUBLICATIONS

Official Action for Chinese Application No. 2006101667639, dated Dec. 23, 2008.

(Continued)

*Primary Examiner* — Kambiz Zand
*Assistant Examiner* — Yonas Bayou
(74) *Attorney, Agent, or Firm* — Sheridan Ross P.C.

(57) ABSTRACT

A monitoring device for a computing device of a computer system includes a remote control module, and a wireless receiving unit disposed on a computing device. The computing device includes an input/output control unit connected electrically to a central processing unit. The remote control module includes a microprocessor, and a connecting interface, a plurality of key units, and a wireless transmitting unit connected electrically to the microprocessor. Each of the key units is depressible to generate a control signal which is transmitted to the microprocessor. The microprocessor transmits the control signal to the input/output control unit through the connecting interface or the wireless transmitting and receiving units according to whether the connecting interface is connected to or disconnected from the input/output control unit so as to communicate with the computing device, thereby protecting the computer system and permitting power management.

32 Claims, 4 Drawing Sheets

FOREIGN PATENT DOCUMENTS

| | | |
|---|---|---|
| CN | 1538306 A | 10/2004 |
| TW | 304251 | 5/1997 |
| TW | 543861 | 7/2003 |
| TW | I252416 | 4/2006 |
| TW | M289873 | 4/2006 |
| TW | 374145 | 2/2011 |

OTHER PUBLICATIONS

Official Action for Taiwan Patent Application No. 095144679, dated Nov. 13, 2009.

* cited by examiner

MONITORING DEVICE FOR A COMPUTING DEVICE OF A COMPUTER SYSTEM, THE COMPUTER SYSTEM, AND METHOD FOR MONITORING THE COMPUTING DEVICE OF THE COMPUTER SYSTEM

CROSS-REFERENCE TO RELATED APPLICATION

This application claims priority of Taiwanese Application No. 095144679, filed on Dec. 1, 2006.

BACKGROUND OF THE INVENTION

1. Field of the Invention

The invention relates to a monitoring device, more particularly to a monitoring device for use in a computer system, and a monitoring method.

2. Description of the Related Art

One common scheme to provide security protection to computer systems is to have relevant data and software encrypted for protection. However, encryption schemes may be broken by operating an input interface (e.g., a keyboard), and are unable to guard against constantly evolving code cracking techniques, so that they are apparently useless. In addition, the power switch of a computer system is currently fixed on a computing device of the system, and remote control of the power of the computer system is as yet unavailable. If the power switch controlling an input interface of the computer system can be connected to the computing device of the computer system in a separable manner, the computer system can be protected through hardware means, and remote control of the computer system and the input interface thereof can be realized. Thus, not only is convenient control possible, security of the computer system will also be enhanced.

SUMMARY OF THE INVENTION

Therefore, an object of the present invention is to provide a monitoring device for remotely controlling a computing device of a computer system.

Another object of the present invention is to provide a computer system having a monitoring device for remotely controlling a computing device of the computer system.

Still another object of the present invention is to provide a monitoring method for remotely controlling a computing device of a computer system.

Accordingly, the monitoring device of this invention is adapted to control a computing device of a computer system, the computing device including a central processing unit and an input/output control unit connected electrically to the central processing unit. The monitoring device includes a wireless receiving unit and a remote control module. The wireless receiving unit is adapted to be disposed on the computing device and to be connected electrically to the input/output control unit. The remote control module is adapted to be connected electrically and detachably to the computing device. The remote control module includes a connecting interface, a microprocessor, a plurality of key units, and a wireless transmitting unit.

The connecting interface is connected electrically and detachably to the input/output control unit. The microprocessor is connected electrically to the connecting interface, and is adapted to be connected electrically to the input/output control unit through the connecting interface. Each of the key units is depressible to generate a control signal. The wireless transmitting unit is connected electrically to the microprocessor.

When the connecting interface is connected electrically to the input/output control unit, the microprocessor transmits the control signal to the input/output control unit through the connecting interface to thereby communicate with the computing device. When the connecting interface is disconnected from the input/output control unit, the microprocessor transmits the control signal to the wireless receiving unit through the wireless transmitting unit to thereby communicate with the computing device.

The computer system of the present invention includes a computing device and a monitoring device. The computing device includes a central processing unit and an input/output control unit connected electrically to the central processing unit. The monitoring device is used to control the computing device, and includes a wireless receiving unit and a remote control module. The wireless receiving unit is disposed on the computing device and is connected electrically to the input/output control unit. The remote control module is connected electrically and detachably to the computing device. The remote control module includes a connecting interface, a microprocessor, a plurality of key units, and a wireless transmitting unit. The connecting interface is connected electrically and detachably to the input/output control unit. The microprocessor is connected electrically to the connecting interface, and is connected electrically to the input/output control unit through the connecting interface. Each of the key units is depressible to generate a control signal. The wireless transmitting unit is connected electrically to the microprocessor.

When the connecting interface is connected electrically to the input/output control unit, the microprocessor transmits the control signal to the input/output control unit through the connecting interface to thereby communicate with the computing device. When the connecting interface is disconnected from the input/output control unit, the microprocessor transmits the control signal to the wireless receiving unit through the wireless transmitting unit to thereby communicate with the computing device.

A method for monitoring a computing device of a computer system of the present invention includes: (A) detecting whether a remote control module is assembled electrically to the computing device; (B) enabling the remote control module to communicate with the computing device through wireless remote control if the remote control module is not assembled electrically to the computing device; and (C) enabling the remote control module to communicate with the computing device through a connecting interface of the remote control module which is connected electrically to the computing device if the remote control module is assembled electrically to the computing device.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
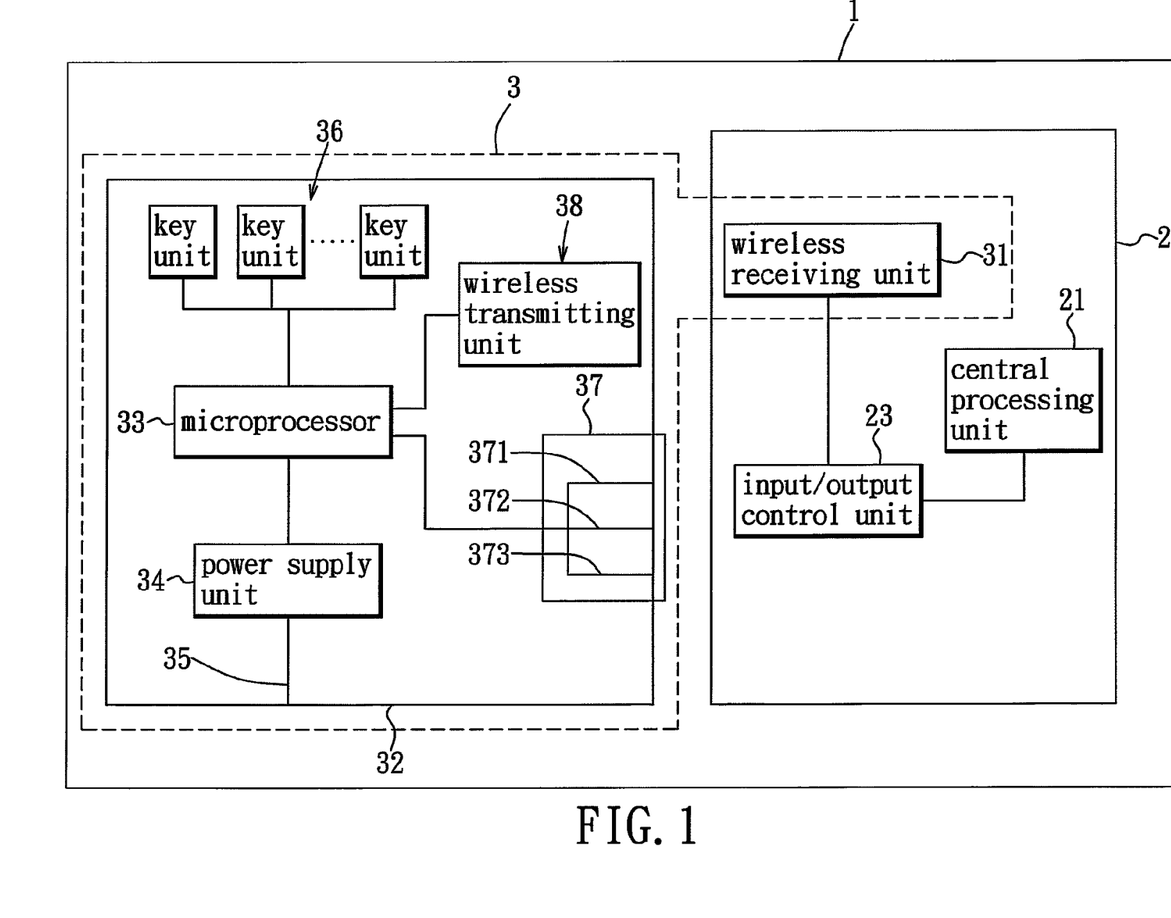
FIG. 1 is a circuit block diagram to illustrate connection between a computing device and a monitoring device of a preferred embodiment of a computer system according to the invention.
Figure 2:
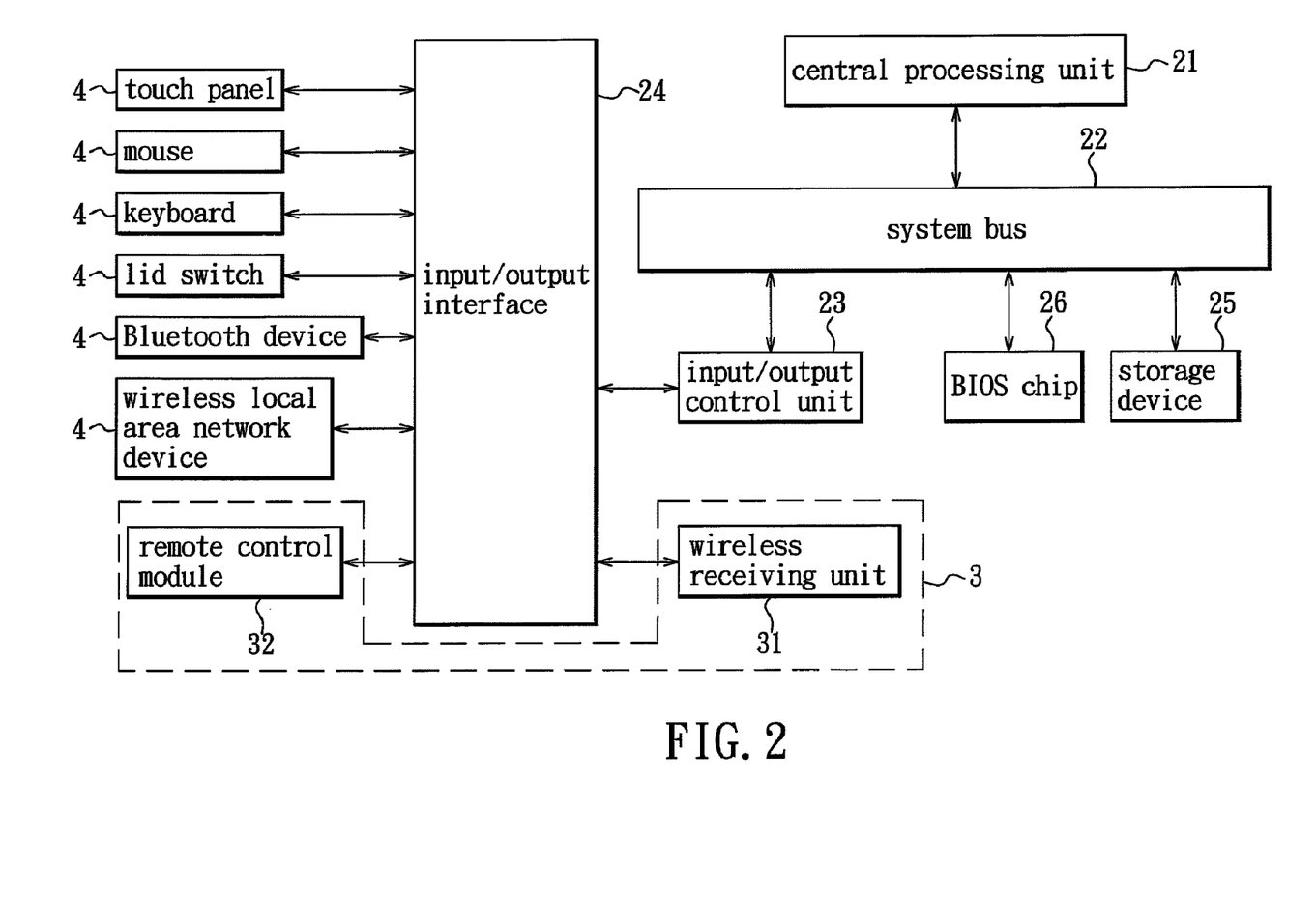
FIG. 2 is a circuit block diagram to illustrate the preferred embodiment of the computer system according to the invention.

Referring to FIGS. 1 and 2, the preferred embodiment of a computer system 1 according to the present invention is shown to include a computing device 2, a monitoring device 3 for monitoring the computing device 2, and a plurality of hardware peripheral devices 4. The computing device 2 includes a central processing unit 21, a system bus 22, an input/output control unit 23, and an input/output interface 24. The input/output control unit 23 is connected electrically to the central processing unit 21 through the system bus 22. The hardware peripheral devices 4 are connected electrically and respectively to the input/output control unit 23 through the input/output interface 24. In this preferred embodiment, the computing device 2 is a notebook computer, and the input/output control unit 23 thereof is realized using a South Bridge. The hardware peripheral devices 4 may include a touch panel, a mouse, a keyboard, a lid switch, a Bluetooth device, and a wireless local area network device. In practice, the computing device 2 may be a desktop computer, and the input/output control unit 23 is not limited to a South Bridge. Moreover, the hardware peripheral devices 4 may also include other peripherals. The input/output interface 24 has connection ports of various specifications. Each of the hardware peripheral devices 4 is connected electrically to a compatible connection port of the input/output interface 24 depending on the specification of a connection port thereof, so as to be connected electrically to the input/output control unit 23.

The monitoring device 3 controls the computing device 2 according to a monitoring method of the computer system 1, and includes a wireless receiving unit 31 and a remote control module 32. The wireless receiving unit 31 is provided on the computing device 2, and is connected electrically to the input/output control unit 23 through the input/output interface 24. The remote control module 32 is connected electrically and detachably to the computing device 2. The remote control module 32 includes a microprocessor 33, a power supply unit 34, a charging pin set 35, a plurality of key units 36 (nine key units 36 being exemplified in this embodiment) connected electrically and respectively to the microprocessor 33 and capable of generating control signals when depressed, a connecting interface 37, and a wireless transmitting unit 38. The remote control module 32 may include only one key unit 36.

The power supply unit 34 is connected electrically to the microprocessor 33 for supplying power to the microprocessor 33. The charging pin set 35 is connected to the power supply unit 34, and is connected electrically and detachably to a power supply (not shown) of the computing device 2, whereby the power supply unit 34 can obtain a supply of power from the power supply (not shown) for charging purposes. In this embodiment, the power supply unit 34 is a lithium battery, but is not limited thereto.

The connecting interface 37 can be connected to or disconnected from the input/output interface 24 of the computing device 2, and can be connected electrically to the input/output control unit 23 of the computing device 2 through the input/output interface 24. The connecting interface 37 includes an insertion/removal detection pin 371, a control signal pin 372, and a data transmission pin 373. The input/output control unit 23 records an identification code corresponding to the computing device 2 in the microprocessor 33 through the data transmission pin 373. The identification code is a universal unique identifier (UUID), and is generally set by the manufacturer of the computing device 2. One identification code can be set in only one computing device 2 and the monitoring device 3 thereof. Thus, the monitoring device 3 and the computing device 2 have a one-to-one relationship, which not only ensures the security of the computing device 2 but also prevents inadvertent actions brought about by another monitoring device 3. In addition, the input/output control unit 23 records the correspondence relationship between the key units 36 and the control signals in the microprocessor 33 through the data transmission pin 373. When the key unit 36 is depressed, the microprocessor 33 outputs a corresponding control signal according to the correspondence relationship. The user may, according to actual requirements and personal preference, execute an application program for the monitoring device 3 as stored in a storage device 25 of the computing device 2, set corresponding functions of the key units 36, and store the same in the microprocessor 33 of the remote control module 32 through the data transmission pin 373, thereby establishing a customized remote control module 32 to facilitate use.

Figure 3:
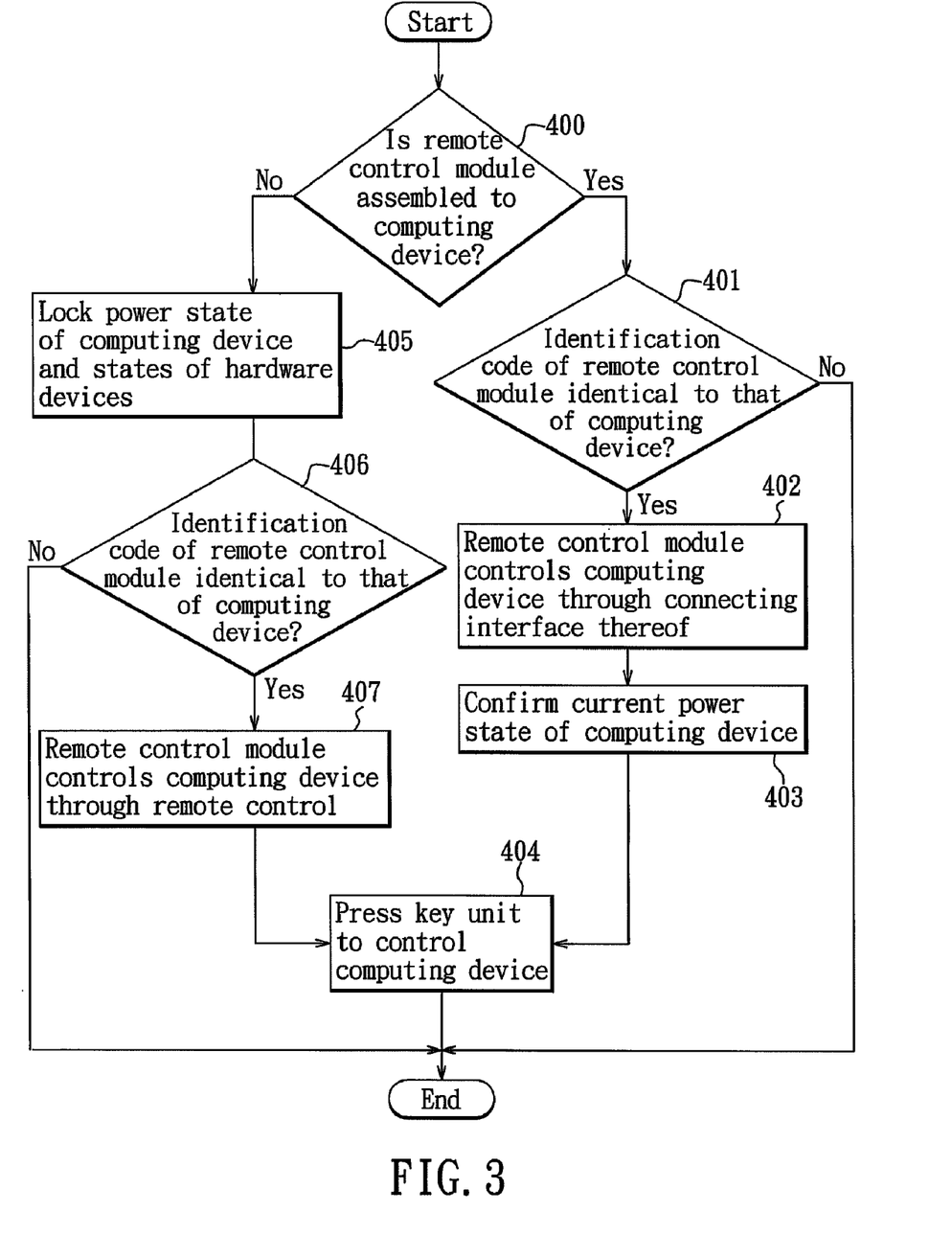
FIG. 3 is a flowchart to illustrate a preferred embodiment of a monitoring method according to the invention.

Referring to FIGS. 1 to 3, in step 400 (see FIG. 3), when the remote control module 32 is assembled electrically to the computing device 2 (e.g., by plugging or fitting), the insertion/removal detection pin 371 and the input/output control unit 23 are connected electrically. The microprocessor 33 can become aware that the remote control module 32 is connected to the computing device 2 through detection of the state of the insertion/removal detection pin 371. Moreover, in order to ensure that the remote control module 32 is connected to the correct computing device 2, in step 401, the microprocessor 33 determines whether the identification code of the remote control module 32 and the identification code of the computing device 2 are identical. If the two identification codes are different, the remote control module 32 is unable to control the computing device 2. On the contrary, if the two identification codes are identical, in step 402, the remote control module 32 can control the computing device 2 through the connecting interface 37. Therefore, when one of the key units 36 is depressed, the microprocessor 33 will transmit the control signal generated by the respective key unit 36 when the latter is depressed to the input/output control unit 23 through the control signal pin 372 so as to enable the computing device 2 to execute the function corresponding to the generated control signal. At this time, the microprocessor 33 can transmit or receive data to or from the input/output control unit 23 through the data transmission pin 373.

At the same time, in step 403, the microprocessor 33 will confirm the current power state of the computing device 2. At this time, in step 404, the user can change the current power state of the computing device 2 through depressing the corresponding key unit 36, and can also depress the other key units 36 depending on actual requirements in order to control the computing device 2. Of the nine key units 36, two are power management keys for controlling the power state of the computing device 2, and the remaining seven keys are function keys for executing preset specific functions.

Figure 4:
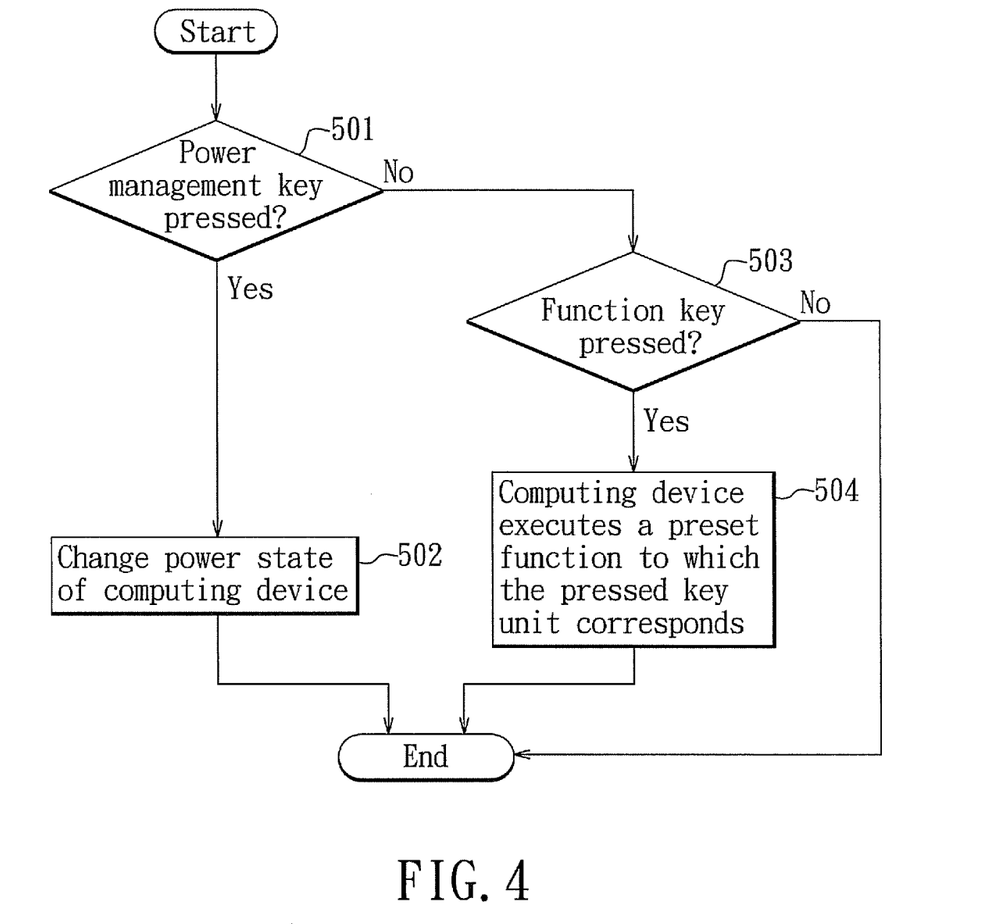
FIG. 4 is a flowchart of the monitoring method, illustrating the functions executed upon pressing of key units.

Referring to FIGS. 1, 2 and 4, in step 501 (see FIG. 4), when a power management key is depressed, the microprocessor 33 transmits a power management signal to the input/output control unit 23, which transmits the power management signal to a BIOS chip 26 of the computing device 2 through the system bus 22. The BIOS chip 26 has stored therein a system power state signal. The BIOS chip 26 will change the system power state signal upon receipt of the power management signal and, in step 502, activate the computing device 2 so that the latter enters into a power state defined by the ACPI standard. There are provided two power management keys in this embodiment. One is a power switch key which, when depressed, controls ON and OFF states of the computing device 2, i.e., causing the computing device 2 to enter into a power off mode (S5) or a normal operating mode (S0). The other is a sleep key which, when depressed three times, causes the computing device 2 to enter into a memory sleep mode (S3), and which, when depressed four times, causes the computing device 2 to enter into a disc sleep mode (S4).

Referring to FIG. 4, when it is determined in step 503 that a function key is depressed, in step 504, the microprocessor 33 transmits to the input/output control unit 23 the control signal to which the depressed function key corresponds, and the input/output control unit 23 transmits the signal to the central processing unit 21 through the system bus 22, and executes an application program of the monitoring device 3 which is stored in the storage device 25 of the computing device 2 so as to execute preset functions. In this embodiment, the function keys include a keyboard control key, a touch panel control key, a mouse control key, a lid switch control key, a Bluetooth device control key, and a wireless local area network control key, which are depressible to control the keyboard, the touch panel, the mouse, the lid switch, the Bluetooth device, and the wireless local area network device of the computer system 1, respectively, so as to put the same into an activated state or a deactivated state. The aforesaid function keys are used to control the hardware peripheral devices 4 connected to the input/output interface 24. Other function keys are used to control the computing device 2 to execute programs. In this embodiment, the key units 36 further include an antivirus software control key. When the antivirus software control key is depressed, the microprocessor 33 will transmit a control signal to the input/output control unit 23. The input/output control unit 23 transmits the signal to the central processing unit 21 through the system bus 22. The central processing unit 21 accesses the antivirus software in the storage device 25 and executes a virus removing action. In addition, the function keys may be preset to control power on and power off of some of the hardware peripheral devices 4. Moreover, the functions assigned to, and the hardware peripheral devices controllable by, the key units 36 are not limited to the above. The computing device 2 may update, add or cancel the functions associated with the key units 36 of the remote control module 32 through the data transmission pin 373 of the connecting interface 37.

Referring to FIGS. 1 to 3, when the microprocessor 33 determines that the remote control module 32 is separated from the computing device 2 in step 400 (see FIG. 3), e.g., when the user takes the remote control module 32 away from the computing device 2, the microprocessor 33 of the remote control module 32 will lock the power state of the computing device 2 and some of the connection ports of the input/output interface 24 in step 405, so that the power of the computing device 2 is maintained at the power state originally set by the user, and so that those hardware peripheral devices 4 which are connected to the input/output interface 24 are locked at the states preset by the user. In this embodiment, the microprocessor 33 locks the keyboard, the touch panel, the mouse, and the lid switch such that the computing device 2 will not execute any corresponding action when any one of the keyboard, the touch panel, the mouse, and the lid switch is operated. Thus, the computer system 1 can be protected against unauthorized users when the remote control module 32 is not available. However, the wireless receiving unit 31 disposed on the computing device 2 is always in an on state, so that the computing device 2 can be controlled by the remote control module 32 through communication between the wireless transmitting unit 38 and the wireless receiving unit 31. In addition, the wireless local area network device and the Bluetooth device can be maintained in an on or off state depending on the user's requirement.

In step 406, the remote control module 32 communicates with the wireless receiving unit 31 of the computing device 2 through the wireless transmitting unit 38 so as to determine whether the identification code of the remote control module 32 is identical to that of the computing device 2. If the two identification codes are different, the remote control module 32 will not be able to control the computing device 2. If the two identification codes are identical, in step 407, the remote control module 32 controls the computing device 2 through remote control. The control signal which is generated when the key unit 36 is depressed will be transmitted to the wireless receiving unit 31 on the computing device 2 through the microprocessor 33 and the wireless transmitting unit 38, and will be further transmitted to the input/output control unit 23. The computing device 2 thus executes the function corresponding to the control signal (step 404). In this embodiment, the wireless transmitting unit 38 and the wireless receiving unit 31 are realized through infrared devices, but are not limited thereto in practice.

In sum, in the monitoring device for a computing device of a computer system, a computer system, and a method for monitoring a computing device of a computer system according to the present invention, regardless of whether the remote control module is assembled to the computing device of the computer system, the computing device can be controlled through the remote control module to execute set functions, so that the user can control the power state of the computing device and the hardware peripheral devices. This not only facilitates monitoring and management but also provides protection to the system through hardware means.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

What is claimed is:

1. A monitoring device for a computing device of a computer system, the computing device including a central processing unit and an input/output control unit connected electrically to the central processing unit, said monitoring device comprising:
   a wireless receiving unit adapted to be disposed on the computing device and to be connected electrically to the input/output control unit; and
   a remote control module adapted to be connected electrically and detachably to the computing device, said remote control module including:
      a connecting interface adapted to be connected electrically and detachably to the input/output control unit,
      a microprocessor connected electrically to said connecting interface and adapted to be connected electrically to the input/output control unit through said connecting interface,
      a plurality of key units each of which is depressible to generate a control signal, wherein a function of at least one of the plurality of key units is operable to be set by a user, and wherein the microprocessor is operable to store the function; and a wireless transmitting unit connected electrically to said microprocessor such that, when said connecting interface is connected electrically to the input/output control unit, said microprocessor transmits the control signal to the input/output control unit through said connecting interface to thereby communicate with the computing device, and such that, when said connecting interface is disconnected from the input/output control unit, said microprocessor transmits the control signal to said wireless receiving unit through said wireless transmitting unit to thereby communicate with the computing device.

2. The monitoring device according to claim 1, wherein said connecting interface includes an insertion/removal detection pin, a control signal pin, and a data transmission pin such that, when said insertion/removal detection pin is connected electrically to the input/output control unit, said microprocessor transmits the control signal to the input/output control unit through said control signal pin, and transmits and receives data to and from the input/output control unit through said data transmission pin, and such that, when said insertion/removal detection pin is disconnected from the input/output control unit, said microprocessor transmits the control signal to said wireless receiving unit through said wireless transmitting unit.

3. The monitoring device according to claim 2, wherein an identification code from the input/output control unit is recorded in said microprocessor through said data transmission pin.

4. The monitoring device according to claim 2, wherein a correspondence relationship between each of said key units and the control signal generated thereby from the input/output control unit is recorded in said microprocessor through said data transmission pin such that, when one of said key units is depressed, said microprocessor outputs a corresponding control signal according to the correspondence relationship.

5. The monitoring device according to claim 2, wherein one of said key units is depressible to send a power management signal so as to control a power state of the computer system.

6. The monitoring device according to claim 2, wherein one of said key units is depressible to control the computer system to execute a program.

7. The monitoring device according to claim 1, wherein said remote control module further includes a power supply unit, which is connected electrically to said microprocessor so as to supply power to said microprocessor.

8. The monitoring device according to claim 3, wherein the identification code is a universal unique identifier (UUID).

9. The monitoring device according to claim 1, wherein, when said connecting interface is disconnected from the input/output control unit, said microprocessor is configured to automatically control operation of the input/output control unit through said wireless transmitting unit and said wireless receiving unit so as to control a power state of the computing device according to a preset user configuration.

10. A computer system comprising a computing device and a monitoring device, said computing device including a central processing unit and an input/output control unit connected electrically to said central processing unit, said monitoring device being disposed to control said computing device and including:

a wireless receiving unit disposed on said computing device and connected electrically to said input/output control unit; and a remote control module connected electrically and detachably to said computing device, and including a connecting interface connected electrically and detachably to said input/output control unit, a microprocessor connected electrically to said connecting interface and connected electrically to said input/output control unit through said connecting interface, wherein the microprocessor is operable to store two or more user customization settings, a plurality of key units each of which is depressible to generate a control signal, wherein each of the two or more user customization settings is applied to a different key unit, and wherein each of the user customization settings applies a user-configured function to the applied key unit, and a wireless transmitting unit connected electrically to said microprocessor such that, when said connecting interface is connected electrically to said input/output control unit, said microprocessor transmits the control signal to said input/output control unit through said connecting interface to thereby communicate with said computing device, and such that, when said connecting interface is disconnected from said input/output control unit, said microprocessor transmits the control signal to said wireless receiving unit through said wireless transmitting unit to thereby communicate with said computing device.

11. The computer system according to claim 10, wherein said connecting interface includes an insertion/removal detection pin, a control signal pin, and a data transmission pin such that, when said insertion/removal detection pin is connected electrically to said input/output control unit, said microprocessor transmits the control signal to said input/output control unit through said control signal pin, and transmits and receives data to and from said input/output control unit through said data transmission pin, and such that, when said insertion/removal detection pin is disconnected from said input/output control unit, said microprocessor transmits the control signal to said wireless receiving unit through said wireless transmitting unit.

12. The computer system according to claim 11, wherein said input/output control unit records an identification code in said microprocessor through said data transmission pin.

13. The computer system according to claim 11, wherein said input/output control unit records a correspondence relationship between each of said key units and the control signal generated thereby in said microprocessor through said data transmission pin such that, when one of said key units is depressed, said microprocessor outputs the corresponding control signal according to a correspondence relationship.

14. The computer system according to claim 11, wherein one of said key units is depressible to send a power management signal so as to control a power state of said computer system.

15. The computer system according to claim 11, wherein said computing device further includes an input/output interface, said connecting interface and said wireless receiving unit being connected to said input/output control unit through said input/output interface.

16. The computer system according to claim 15, further comprising a plurality of hardware peripheral devices, said input/output interface being connected electrically to said hardware peripheral devices, wherein the control signal generated when the respective one of said key units is operated is transmitted to said input/output interface through said connecting interface and said wireless receiving unit so as to control a corresponding one of said hardware peripheral devices connected to said input/output interface.

17. The computer system according to claim 11, wherein one of said key units is depressible to control said computing device to execute a program.

18. The computer system according to claim 10, wherein said remote control module further includes a power supply unit, which is connected electrically to said microprocessor so as to supply power to said microprocessor.

19. The computer system according to claim 18, wherein said computing device further includes a power supply device, and said remote control module further includes a charging pin connected to said power supply unit, said charging pin being connected electrically to said power supply device such that said power supply unit obtains power for charging from said power supply device.

20. The computer system according to claim 12, wherein said identification code is a universal unique identifier (UUID).

21. The computer system according to claim 10, wherein, when said connecting interface is disconnected from said input/output control unit, said microprocessor is configured to automatically control operation of said input/output control unit through said wireless transmitting unit and said wireless receiving unit so as to control a power state of said computing device according to a preset user configuration.

22. A method for monitoring a computing device of a computer system, comprising:
 (A) detecting whether a remote control module is assembled electrically to the computing device;
 (B) enabling the remote control module to communicate with the computing device through wireless remote control if the remote control module is not assembled electrically to the computing device;
 (C) enabling the remote control module to communicate with the computing device through a connecting interface of the remote control module which is connected electrically to the computing device if the remote control module is assembled electrically to the computing device;
 (D) receiving input from a key unit; and
 (E) in response to receiving input from the key unit, a microprocessor sending a user-customized control signal to the computing device, wherein the user-customized control signal was set by a user and associated with the key unit in the microprocessor.

23. The method according to claim 22, wherein step (B) includes a sub-step (B-1) of determining whether an identification code of the remote control module is identical to that of the computing device so as to further determine whether the computing device is to be controlled by the remote control module.

24. The method according to claim 22, wherein step (C) includes a sub-step (C-1) of determining whether an identification code of the remote control module is identical to that of the computing device so as to further determine whether the computing device is to be controlled by the remote control module.

25. The method according to claim 23, wherein step (B) further includes automatically setting a power state of the computing device and states of hardware peripheral devices to be monitored and controlled solely through the remote control module.

26. The method according to claim 24, wherein step (C) further includes confirming a power state of the computing device.

27. The method according to claim 25, wherein a key unit of the remote control module is depressible to change the power state of the computing device.

28. The method according to claim 26, wherein a key unit of the remote control module is depressible to change the power state of the computing device.

29. The method according to claim 25, wherein a key unit of the remote control module is depressible to control the computing device to execute a preset function to which the key unit of the remote control module corresponds.

30. The method according to claim 26, wherein a key unit of the remote control module is depressible to control the computing device to execute a preset function to which the key unit of the remote control module corresponds.

31. The method according to claim 23, wherein the identification code is a universal unique identifier (UUID).

32. The method according to claim 24, wherein the identification code is a universal unique identifier (UUID).

* * * * *